United States Patent [19]

Negre et al.

[11] 4,106,638

[45] Aug. 15, 1978

[54] SHIP AND SHORE LOAD HANDLING SYSTEM WITH AN ASYMMETRICAL SHAPED PONTOON FOR SUPPORTING CARRIAGE CABLES

[76] Inventors: Henri Negre, 8 & 10, rue Talma, 75016 Paris; Jean-Pierre Cathiard, 38360 Noyarey, both of France

[21] Appl. No.: 728,958

[22] Filed: Oct. 4, 1976

[30] Foreign Application Priority Data

Oct. 13, 1975 [FR] France .............................. 75 31333

[51] Int. Cl.² .................... B63B 27/00; A01D 90/00; B66C 21/00
[52] U.S. Cl. ............................... 214/14; 214/38 CA; 212/76
[58] Field of Search .................................. 214/12–14, 214/38 CA; 104/90, 112; 114/48–49, 121; 212/3, 72, 76–123

[56] References Cited

U.S. PATENT DOCUMENTS

| 736,996 | 8/1903 | Miller | 212/72 |
| 773,295 | 10/1904 | Miller | 212/90 |
| 1,053,305 | 2/1913 | Leue | 212/72 |
| 3,704,796 | 12/1972 | Dedons et al. | 214/14 |
| 3,812,788 | 5/1974 | Laurent | 104/130 |
| 3,830,178 | 8/1974 | Lang | 114/49 |

FOREIGN PATENT DOCUMENTS

| 27,380 | 8/1955 | Finland | 214/14 |
| 776,237 | 10/1934 | France | 214/14 |
| 6,922 | 9/1879 | Fed. Rep. of Germany | 214/13 |
| 140,476 | 5/1953 | Sweden | 214/14 |
| 2,624 of | 1871 | United Kingdom | 214/14 |

*Primary Examiner*—Drayton E. Hoffman
*Assistant Examiner*—R. B. Johnson
*Attorney, Agent, or Firm*—Stevens, Davis, Miller & Mosher

[57] ABSTRACT

Installation for loading and unloading ships anchored at a distance from the shore. An overhead transporter with an aerial cable passing over the ship connects a pontoon to the shore. The moment exerted on the pontoon by the tensioned cable is compensated at least partially by an asymmetrical form of the hull of the pontoon.

3 Claims, 6 Drawing Figures

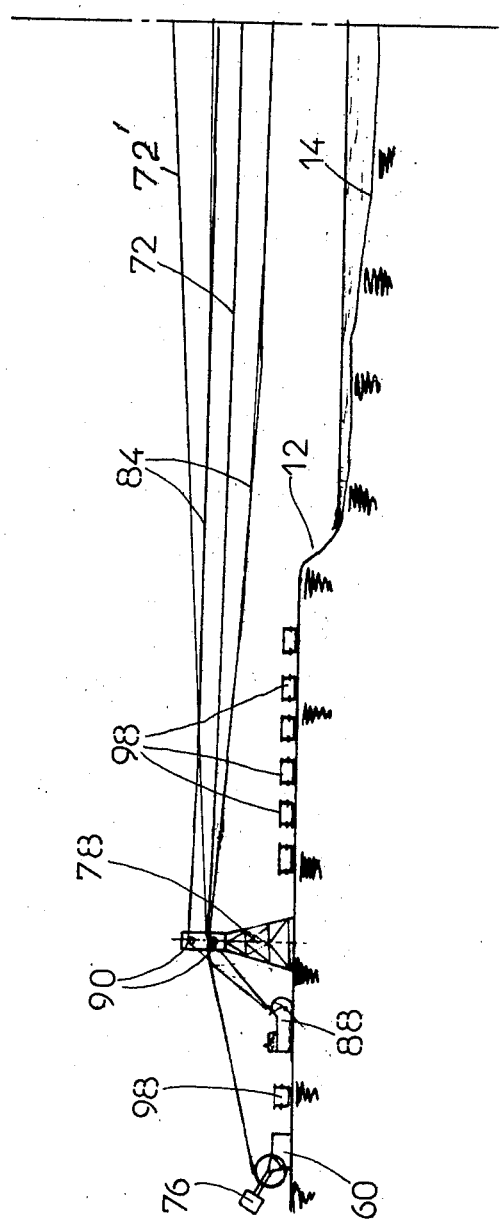

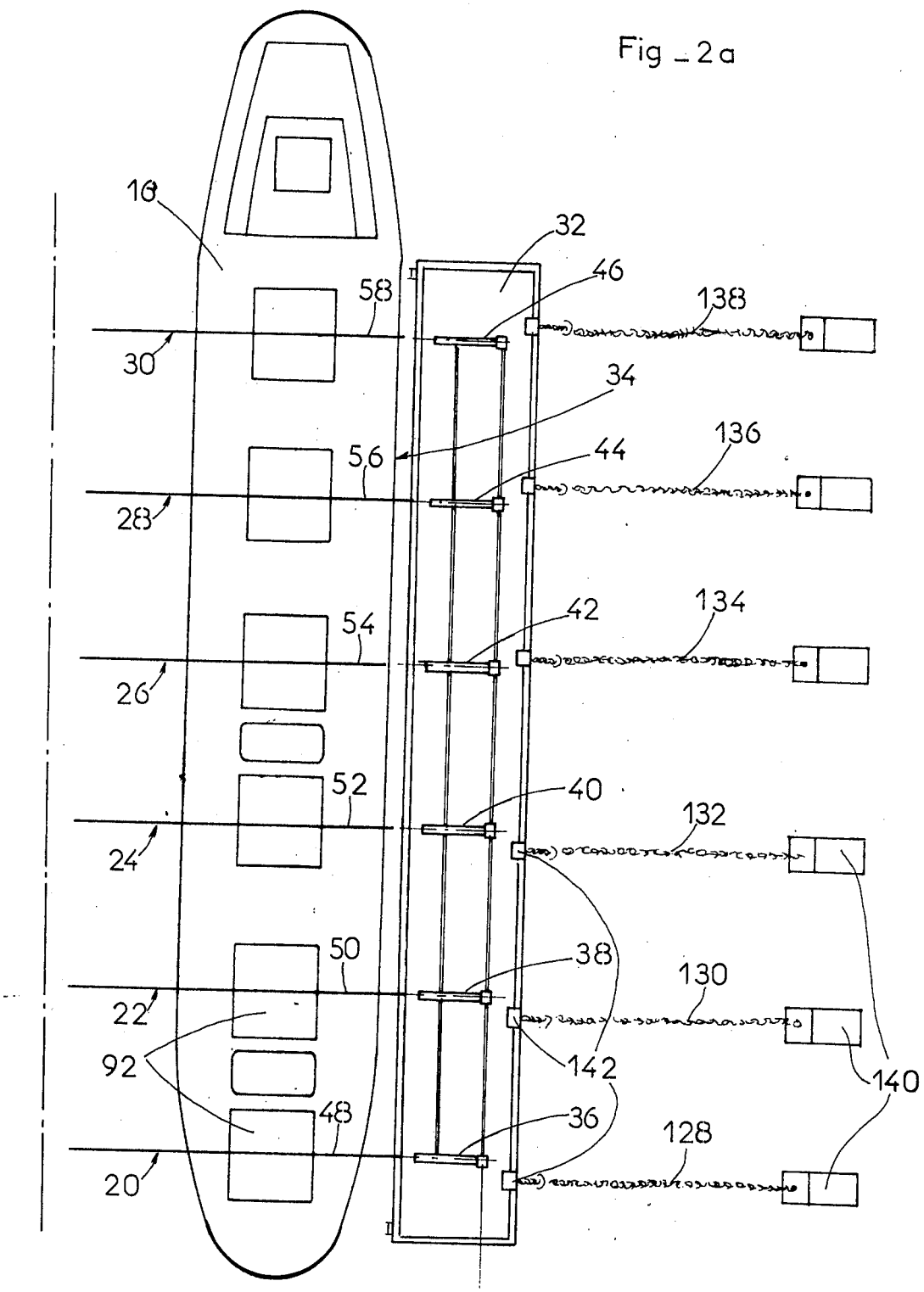
Fig_2a

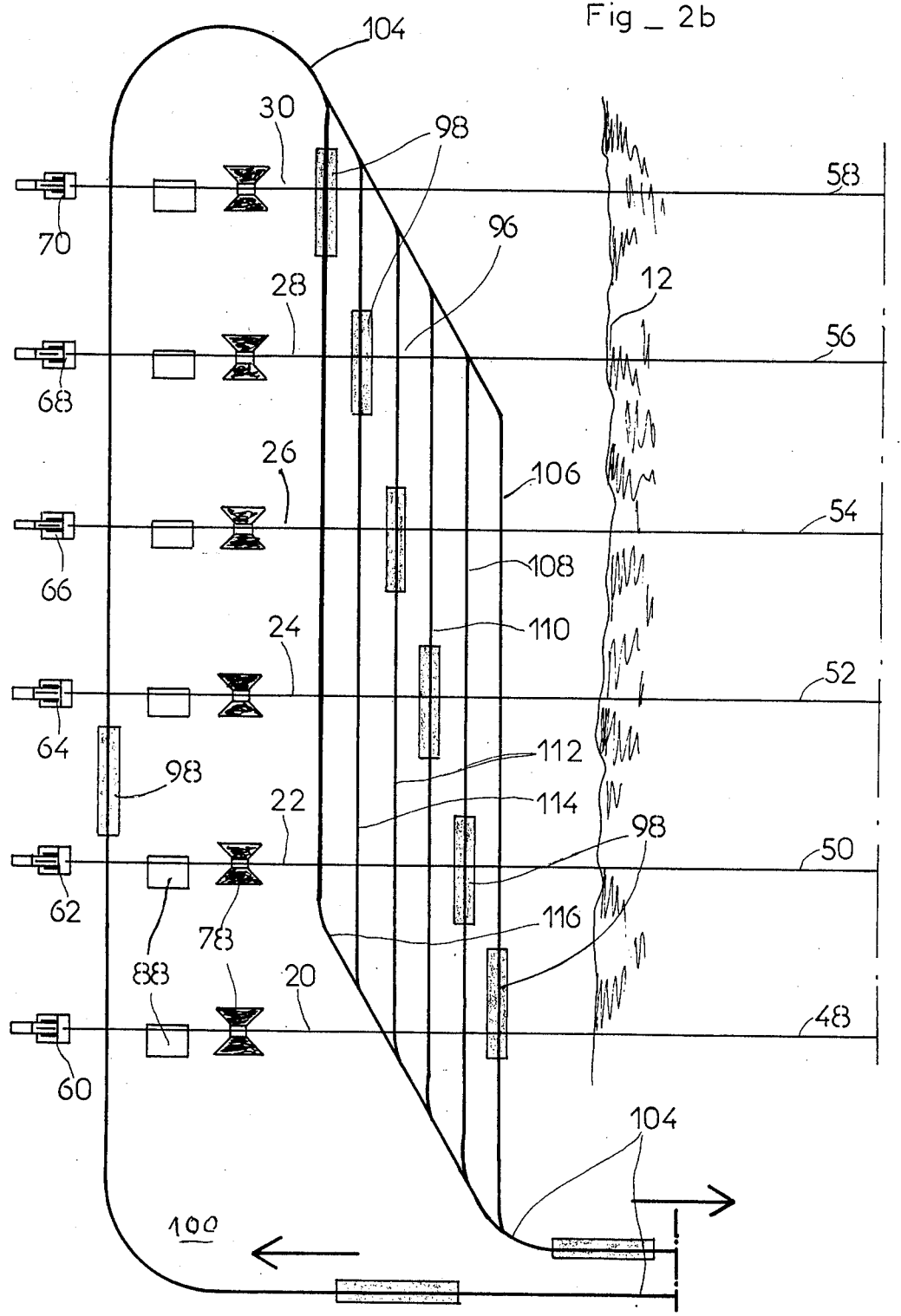

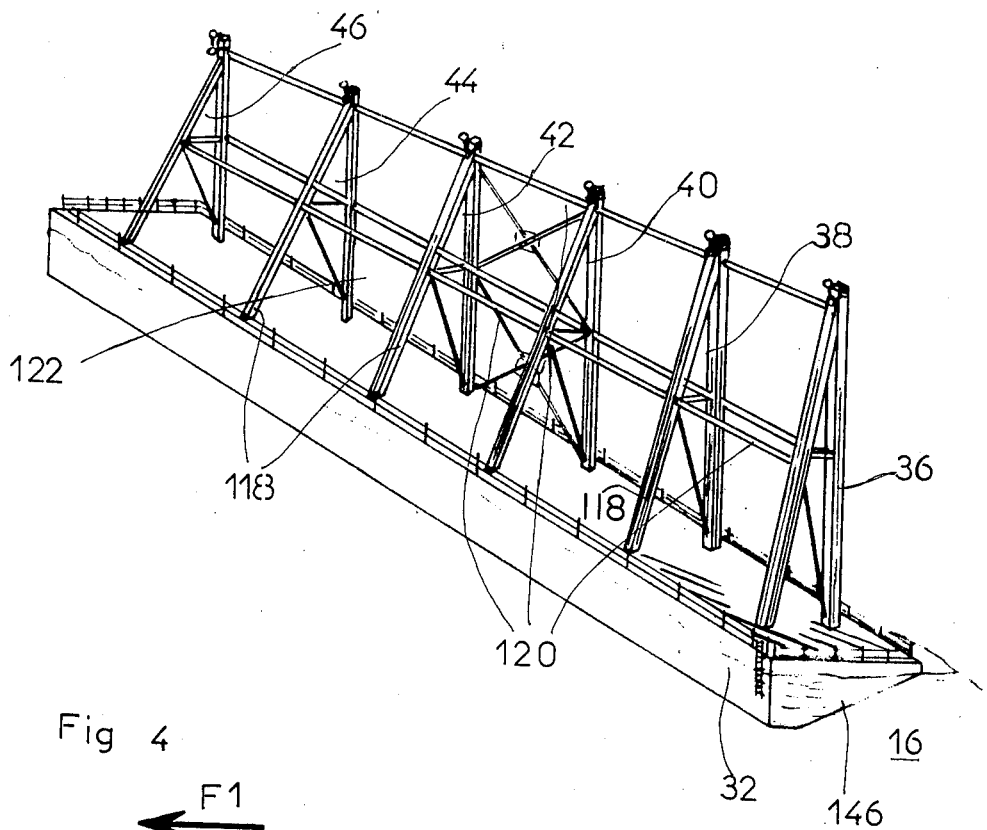
Fig_3
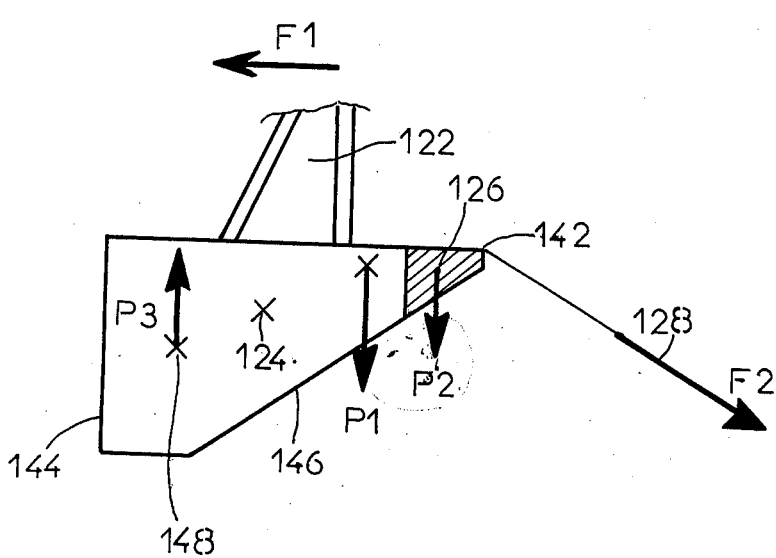
Fig 4

SHIP AND SHORE LOAD HANDLING SYSTEM WITH AN ASYMMETRICAL SHAPED PONTOON FOR SUPPORTING CARRIAGE CABLES

BRIEF SUMMARY OF THE INVENTION

The invention relates to an installation for loading and unloading ships.

Port installations necessitate a costly infrastructure and works which are difficult to execute rapidly. For oil tankers with deep draughts there exist loading and unloading points outside ports in zones accessible to ships, which are connected with the shore by means of pipelines, but it is clear that this solution is applicable only to liquid or pulverant products.

The object of the present invention is to remedy these disadvantages and to permit the realization of an installation for loading and unloading ships anchored at a distance from the shore.

The installation in accordance with the present invention comprises a floating pontoon anchored near the shore in a zone of which the depth makes it accessible to the ship to be loaded or unloaded, and at least one overhead cable transporter anchored at one end to the top of a pier installed on the pontoon, and at the other end to an anchorage on the shore, the said overhead cable connecting the pontoon to the shore, and passing over the ship, to permit the transferring of a load from the ship to the said transporter and vice versa.

Overhead cable transporters permit large spans of several hundred meters, generally sufficient to reach zones of sea depths corresponding with the draughts of ships. The use of a floating pontoon for the anchorage of the overhead transporter avoids fixed installations constructed on the sea-bed which are costly and difficult to execute.

The overhead transporter or transporters are of the cableway type, with a skip circulating in to-and-fro on a track cable, a haulage cable controlling the travel and hoisting and a cable raising and lowering the skip in a manner well known in itself. The loads transported by the skip are taken over on the shore by a land transporter, and taken to a stocking area, this transporter being for preference of the type described in U.S. Pat. No. 3,812,788.

The anchorage of the overhead cable at the shore end, most particularly the track cable, can be fixed, or with a tensioning counterweight, in accordance with a technique well known to experts. At the sea end the track cable and the haulage cable are anchored or fixed to the floating pontoon at the top of a pier of sufficient height to allow ships to pass under the cables. The moment exerted on the pontoon by the tensioned cables tends to tip the pontoon and this moment is compensated at least partially by a judicious form of the hull of the pontoon displacing the centre of Archimede's thrust towards the cable. The chains mooring the pontoon to the sea-bed, and the distribution of the loads participate advantageously in the compensation of this moment.

The floating pontoon follows the movements of the sea, and is thus always on a level with the ship. It forms a floating anchorage for the track cable which may possibly be used to maintain the cable under tension, and the anchorage on the shore would no longer be necessarily with a counterweight.

The floating pontoon can be equipped with stabilizers, to limit the effects of the swell, and intermediate towers, fixed on the sea bed or carried by pontoons may be provided should the span be too long.

Other advantages and features will be brought out more clearly in the following description of a mode of using the invention, given as a non-restrictive example and shown in the attached drawings, in which:

FIGS. 1a and 1b are schematic views in elevation of the installation, FIG. 1a showing the part at sea and FIG. 1b the part on shore;

FIGS. 2a and 2b are top plan views of the installation in accordance with FIG. 1;

FIG. 3 is a view in perspective of the floating pontoon shown in FIG. 1, the cables not being shown;

FIG. 4 shows schematically the distribution of the external forces exerted on the pontoon.

Figure 1A:
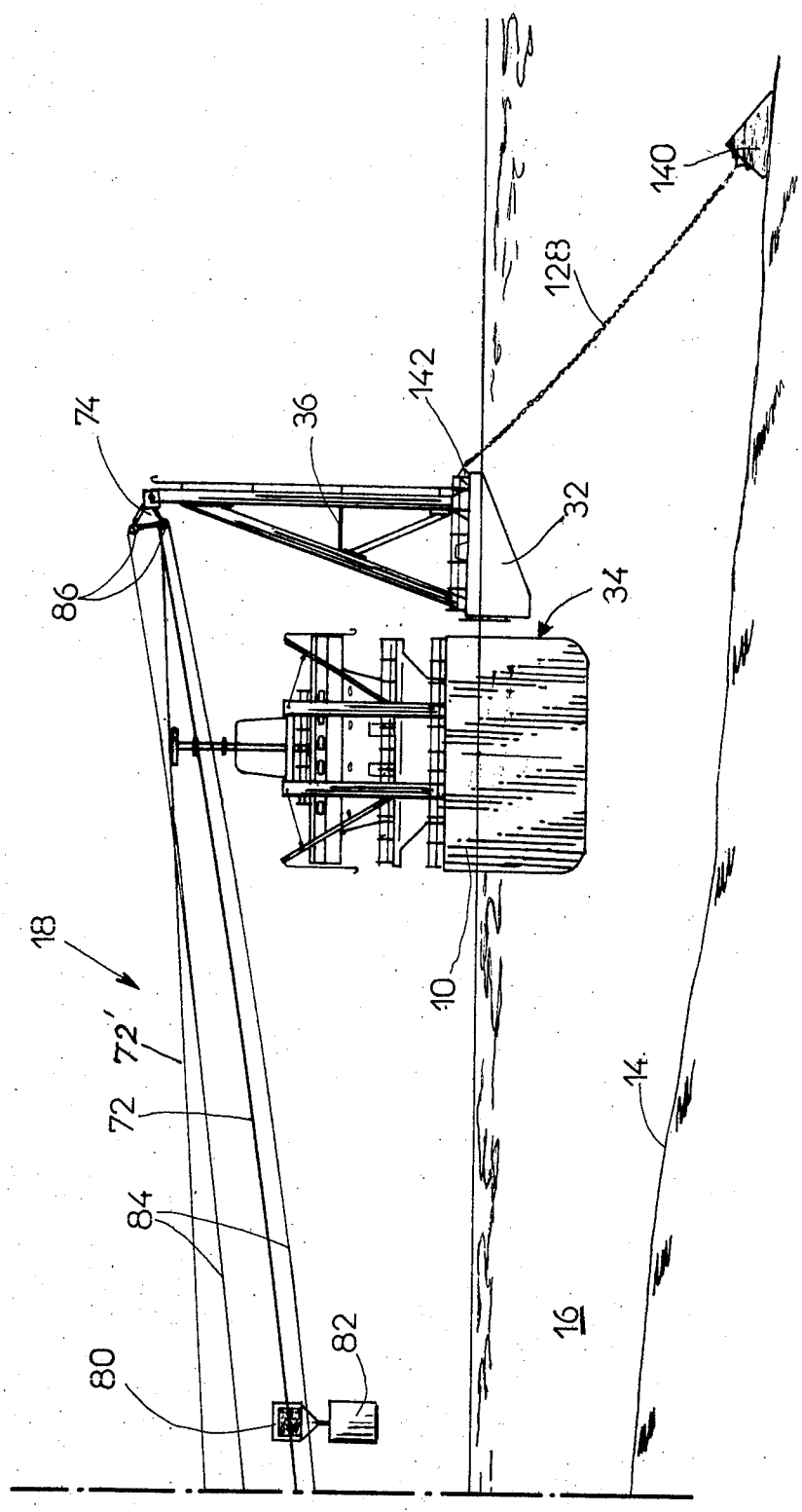

In these figures, a ship 10 to be loaded or unloaded is moored at a distance from the shore 12, in a zone where the bed 14 of the sea 16 provides sufficient depth, under a loading or unloading installation designated by the general identification 18 and called and described later as unloading installation although usable for loading of the ship. Six overhead cable transporter 20, 22, 24, 26, 28, 30 stretch in parallel perpendicularly to the centre-line of ship 10, between the shore 12 and a floating pontoon 32 anchored against the far side 34 of the ship 10. The pontoon 32 of elongated form and appreciably the same length as the ship 10 carries six piers 36, 38, 40, 42, 44, 46, spaced out and each being associated with one of the transporters 20 to 30. The height of piers 36 to 46 in the form of trestles is greater than the superstructure of the ship 10 and at the tops of the different piers are fixed the equipments of the overhead cables designated by the general identifications 48, 50, 52, 54, 56, 58 of the different transporters 20 to 30, the opposite ends of which are fixed to anchorages 60, 62, 64, 66, 68, 70, situated on shore 12 in such a manner that cables 48 to 68 pass above ship 10.

The transporters 20 to 30 of the cableway type are all identical and one of them only, 20, is described below. The cables as a whole 48 of transporter 20 include a haulage cable 84 and a track cable 72 with a fixed anchorage 74 at the top of pier 36 on pontoon 32 and with an anchorage 60, with a tensioning counterweight 76 and a support tower 78 on the shore 12. A carriage 80 carrying a skip or a lifting hook 82 can move to and fro on track cable 72. Carriage 80 is hauled by the endless haulage cable 84 running over idler sheaves 86 fixed at the top of pier 36, and on the shore side in a winch 88 and support sheaves 90 fixed on tower 78. In the example illustrated by the figures, haulage cable 84 also hoists skip 82 by operating a winch (not shown) carried by carriage 80, but it is clear that an independent hoisting cable can also stretch parallel with the track and haulage cables perform the lifting operation in the manner normally used in cableways. It is needless to describe in greater detail this type of transporter currently in use on public works sites. Carriage 80 being above a hold 92 of ship 10, the skip 82 is lowered and after the fixing of the load the skip is raised once again and hauled along cable 72 to the shore 12. When the transporter 20 is discharged the cable 72 will revert to its high position 72', permitting the free passage of the ship.

The cargo may be stocked on the shore, but it is advantageous that it should be taken over directly by a land transporter-system designated by the general identification 96, which transfers it to a stocking zone (not shown). The land transport 96 may be of any type, but in accordance with a preferred mode of transport it comprises passive vehicles 98 running on a closed circuit 100 of tracks, coupled to and hauled by an endless traction cable (not shown) on the main tracks 104. Transporter 96 has six branch lines 106, 108, 110, 112, 114, 116, the tracks of which run under the overhead transporters and perpendicular to them, each branch being associated with one of the overhead transporters and connected above and below to the main tracks 104. The load transported by the overhead transporter 20 is placed directly on vehicle 98 waiting on branch 106. As soon as vehicle 98 is loaded, it is propelled, for example by means of a friction-wheel system (not shown) to the main track 104, where it is coupled to the haulage cable and hauled to the stocking zone (not shown). After discharging it continues its travel and returns to branch 106 for a new load. A land installation of this type is described in the above mentioned patent to which it would be advantageous to refer for more ample details. The unloading (or loading) takes place without handling and without discontinuity, the transporters operating independently of one another. The holds are emptied simultaneously when the transporters are sufficient in number, but it is clear that the holds can be emptied in succession by moving the ship.

On referring more particularly to FIGS. 3 and 4, it is seen that the six piers 36 to 46, each consisting of a trestle with strut 118 are joined together by braces 120 to form a framework 122 offset laterally in relation to the axial vertical plane of the pontoon in the direction opposite to that of the cables anchored to the piers. Weight P1 of the offset framework 122 exerts a tipping moment or torque on the pontoon in relation to the instantaneous centre of rotation 124 of the pontoon, in a direction opposed to the resultant moment of F1 exerted on the tops of piers 36 by the tensioned cables. A ballast 126 of a weight P2 offset in the same direction as framework 122, exerts a moment in the same direction as that of framework 122 and shares the equilibrating of the moment due to force F1.

Pontoon 32 is moored by six chains 128, 130, 132, 134, 136, 138, fixed at one end to foundations 140 poured on the sea bed, and at the other end to points 142 on the deck of pontoon 32, the whole being so arranged that chains 128 to 138 stretch in the direction opposite to the cables and obliquely towards the sea bed. It is easily seen that the mooring force F2 exerted by chains 128 to 138 on pontoon 32 exerts a moment favourable to the compensation of the moment of force F1.

The hull 144 of pontoon 32 is asymmetrical in relation to the axial vertical plane, the bottom 146 being formed by a plane inclined so as to obtain an immersion height and thus an Archimede's thrust P3 greater on the side on which the overhead cables are fixed than that of the opposite side. The centre of thrust 148 is thus offset on the overhead cable side and the moment of the resultant of thrust P3 applied to the centre of thrust 148 shares in the compensation of the traction of the overhead cables.

These means as a whole, in the occurrence the offset of the framework, the ballast, the arrangement of the mooring chains and the shape of the hull, make it possible to avoid the tipping of the pontoon under the high stress exerted by the cables at the top of the piers. It should be noted that according to the installations, some of these means, the ballast for instance, are not indispensable and that additional means, such as a counterweight fitted to the top of the piers, extra floats or bearing points on the ship, could of course be used.

The floating pontoon takes up under the action of the exterior forces F1, F2, P1, P2, P3 a position of stable equilibrium which in practice does not vary or varies little with the load carried by the different transporters. The pontoon follows, as does the ship, the variations in the level of the sea, due in particular to the tides. The oscillations resulting from the swell do not hinder the correct operation of the transporters and should this be necessary they can be limited by an appropriately shaped pontoon hull, or by the addition of stabilizers.

The floating pontoon can serve as counterweight for tensioning the cables, when these are anchored on the shore. The access of the ship to the unloading zone is not hindered by fixed infrastructures or by mooring lines to buoys. The overhead transporters can either converge or diverge according to the site where they are installed.

What is claimed is:

1. An installation for the loading and unloading of a ship anchored in a zone near a shore, comprising:

a number of transporters each having an aerial cable and a first fixing point on the shore for the said cable, an elongated floating pontoon moored in the said zone, in a position parallel to a ship, and having a partially submerged hull with a longitudinal axis, a center of gravity and a center of thrust on which is exerted Archimedes' thrust, a number of piers carried and spaced along said pontoon, each pier having a second point of anchorage for respective cables thereon so that the cables stretch in parallel relationship between the pontoon and the shore while passing transversely over the ship, the said cables exerting a tipping moment on the pontoon, the shape of the said hull being asymmetrical about said longitudinal axis, the immersed part of said hull on the cable side being the larger in volume, so as to offset transversely the said center of thrust in relation to the said center of gravity in the direction of the said cables and engender a moment on the pontoon in opposition to the moment exerted by said cables, a ballast positioned on said pontoon so as to exert a moment in opposition to the moment exerted by said cables, and a means of mooring said pontoon which stretches in a direction opposite to that of the said aerial cables and is fixed to the pontoon so as to exert a moment in opposition to the moment exerted by said cables.

2. An installation as claimed in claim 1, each of said transporters comprising a carriage capable of being moved along a respective said cable.

3. An installation as claimed in claim 1, including in addition a land transporter on the shore with tracks and wagons running on the tracks, the cables of said number of transporters passing over tracks of said land transporter for the loading and unloading of said wagons and of said ship.

* * * * *